United States Patent Office 2,973,025
Patented Feb. 28, 1961

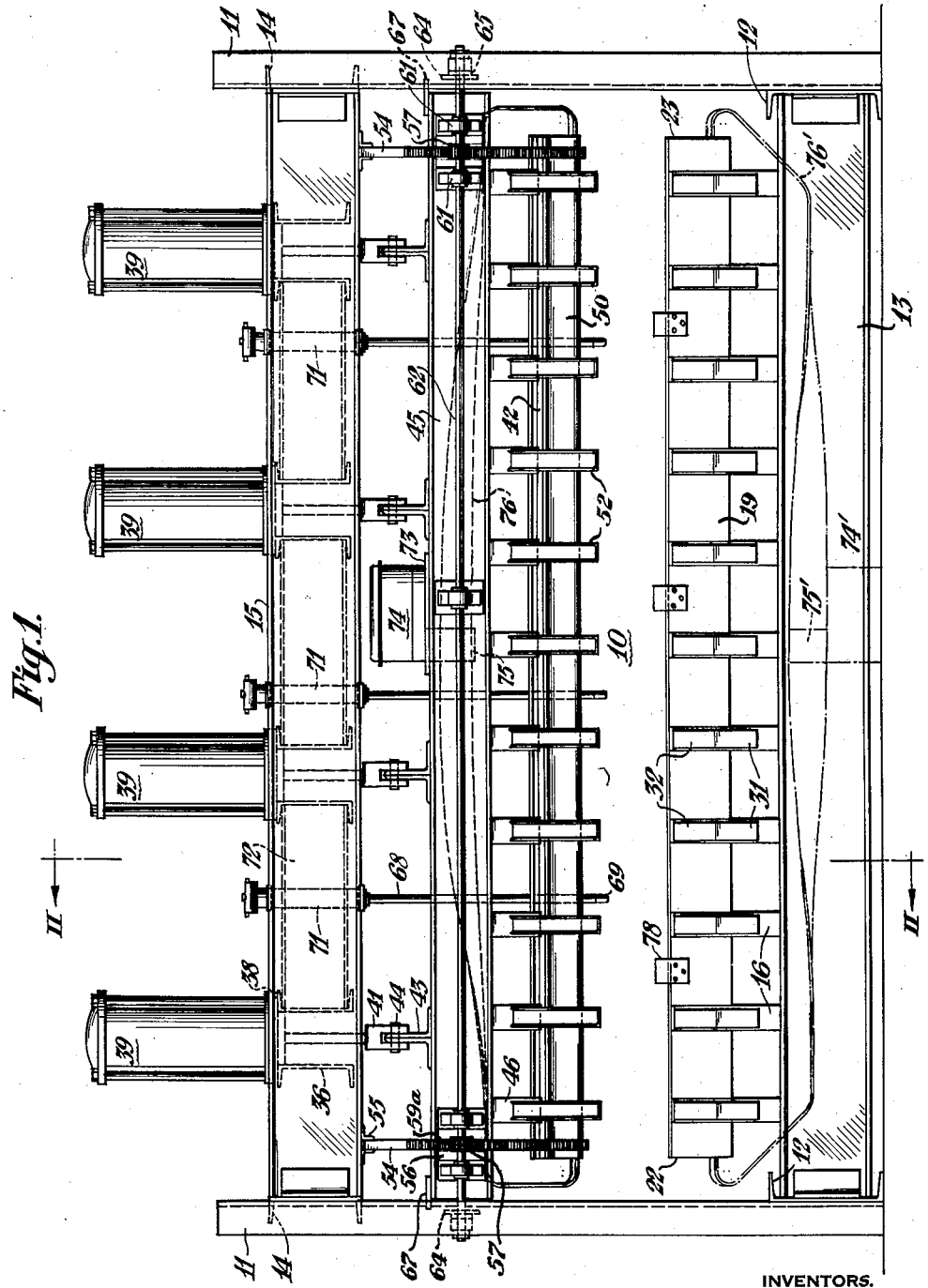

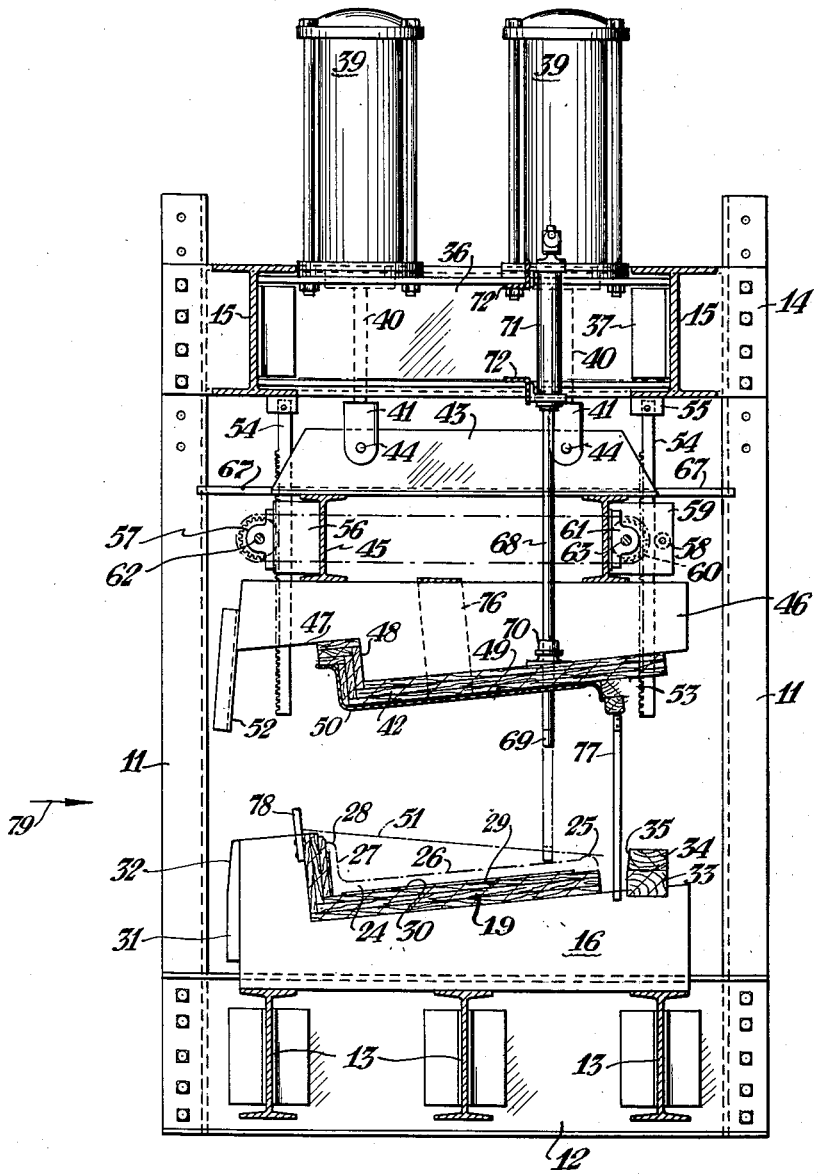

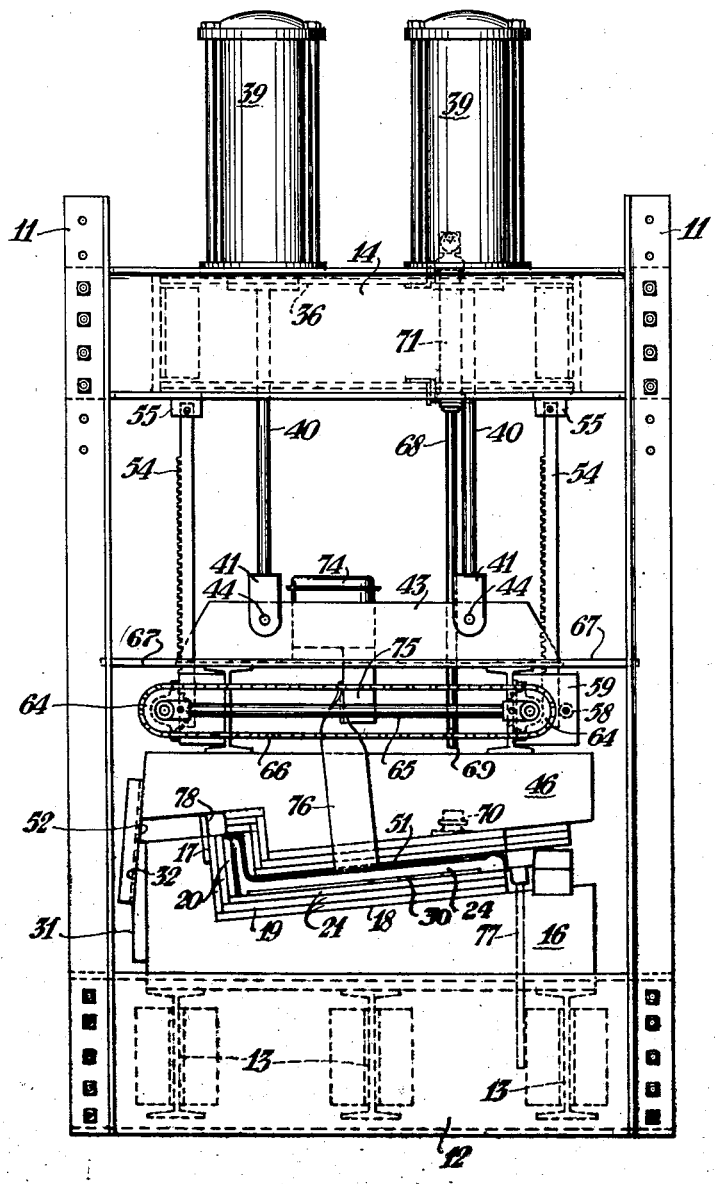

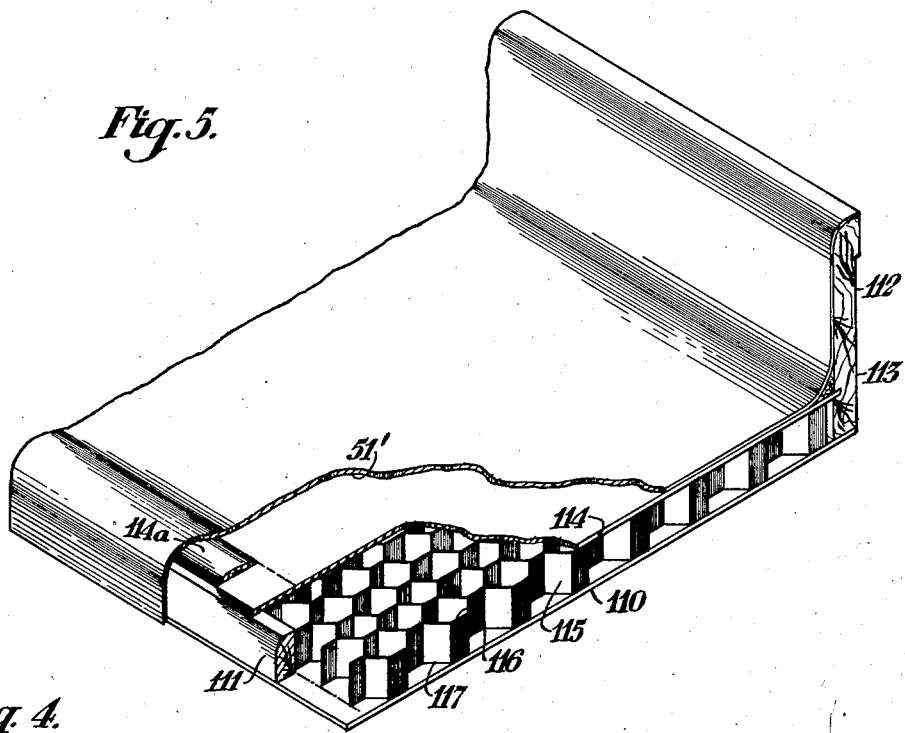
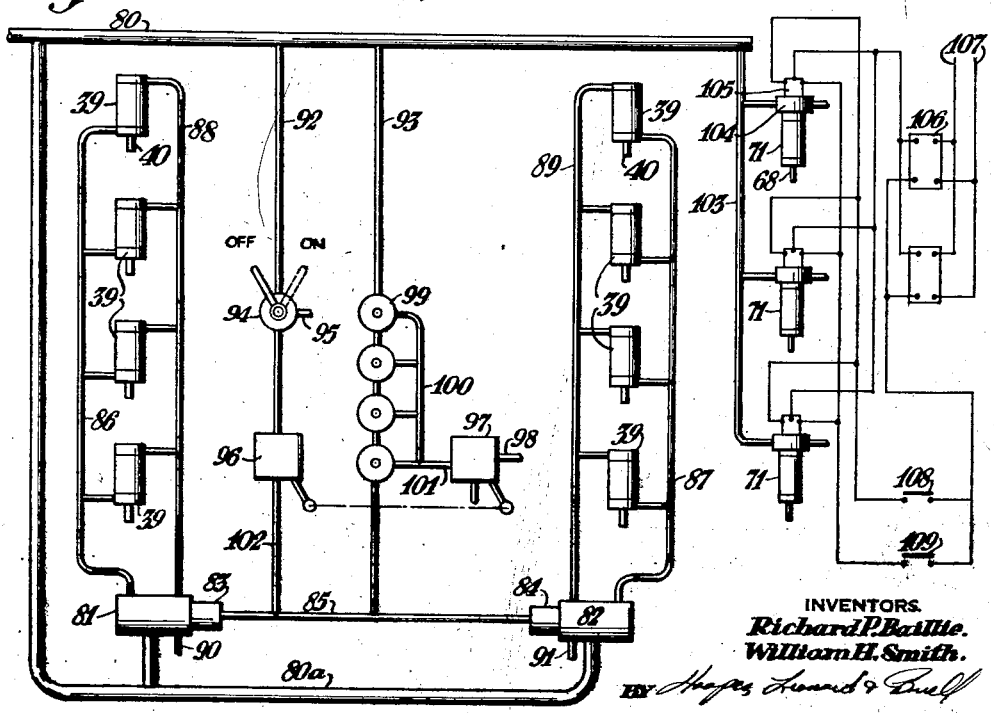

2,973,025

APPARATUS FOR MAKING SURFACE SHAPES COVERED WITH FORMED SHEET MATERIAL

Richard P. Baillie, Forward Township, Butler County, and William H. Smith, Evansburg, Pa., assignors, by mesne assignments, to Demmler and Schenck Company, Evans City, Pa., a corporation of Pennsylvania Filed July 6, 1955, Ser. No. 520,334

6 Claims. (Cl. 154—1)

This invention relates to apparatus for making counter tops or the like covered with formed sheet material which may be of a nature like formable "Formica" or "Micarta" or other formable plastic-type material, usually of decorative appearance. More particularly, this invention pertains to a new machine capable of utilizing a base for such counter tops or the like as a die and for shaping close fitting sheet material covers thereagainst and bonding said covers thereto.

Our new apparatus is an improvement upon our pending application for Letters Patent, Serial No. 452,322, filed August 26, 1954. Advantages of our new apparatus are, inter alia, that its different construction more readily lends itself to mass production; to the making of different kinds of counter tops or the like covered with formed sheet material; provides a new kind of semiautomatic construction with provision for the safety of workmen; and enables the operations to be performed with the base elements of such counter tops or the like utilized as a die in readily workable right-side-up position. Other objects and advantages will be apparent from the following description and the accompanying drawings, which are illustrative only, in which Figure 1 is a view in front elevation of one embodiment of our new apparatus with the platens in open position;

Figure 2 is a view of the embodiment shown in Figure 1 taken along line II—II of Figure 1;

Figure 3 is a view similar to that shown in Figure 2 with the new apparatus closed to shape and bond formable sheet material to the base of a counter top or the like;

Figure 4 is a schematic view of one form of pneumatic circuit which may be utilized in the operation of movable platen and holddown means in the embodiment illustrated in Figures 1 to 3; and Figure 5 illustrates a new kind of base utilizing formed sheet material as a surface which has been shaped by means of our new apparatus.

Referring to Figures 1 to 3 of the drawings, our new apparatus may comprise a machine 10 having vertical structural corner posts 11 joined at the lower ends thereof by transverse structural channels 12 which in turn are joined by longitudinally extending beams 13. The frame for machine 10 comprising the corner posts 11, the channels 12 and the beams 13 may be completed by binding the corner posts at the upper ends thereof by transverse channels 14 which in turn are connected by longitudinally extending beams 15, thereby effecting a cubical frame construction of strength and rigidity. In this description, the terms "upper" and "lower" are to be deemed relative terms rather than terms having absolute meanings. A plurality of spaced parallel transverse bars 16 rest on and are secured to the longitudinal beams 13, the upper side of bars 16 being recessed to provide a back surfce 17 and a top surface 18 in respective longitudinal registry for a lower platen 19. Lower platen 19 comprises a plurality of plies 20 in butt joint relation to a further plurality of respective plies 21 at right angles thereto, the plies extending substantially from one end 22 to the other end 23 of such platen. The plies 20 and 21 may be made of strong wood or other suitable material bonded together to form a recess, which is a right angle in the illustrated embodiment, suitable for the receipt and uniform support of a preferably preformed base 24 for a kitchen counter top or the like. Thus, in the case of a kitchen counter top having a base like base 24, which may be made of wood, there may be a slightly elevated so-called "no-drip" front edge 25, a flat top portion 26, a splash back portion 27 and a finish edge 28. In the case where base 24 is provided with a rectilinear invert recess 29, the generally upwardly facing surface of platen 19 may have a pad 30 affixed thereto to fit in such an invert recess 29 and register base 24 in correct position on platen 19 so that it is uniformly supported over its under and back surface by platen 19, the base 24 itself serving as a "lower die."

The front ends of bar 16 are provided with guide strips 31 having upwardly tapered surfaces 32. The rear ends of the bars 16 are provided, in the illustrated embodiment, with longitudinally extending blocks 33 having guide blocks 34 attached thereto, the forward surfaces 35 of which are also upwardly tapered.

Extending transversely between the upper longitudinal beams 15 are respective pairs of support channels 36 fastened to such beams 15 by angle plates 37. Each such pair of support channels 36 is in symmetrically spaced relation between the ends of the machine and have seat plates 38 affixed thereto on which double acting pneumatic cylinders 39 are supportably mounted and secured. In the illustrated embodiment, there are eight such pneumatic cylinders 39 through the lower bushed head of which projects a piston rod 40 terminating in a clevis 41. The piston rods 40 and clevises 41 are adapted to be raised and lowered in unison by the pistons (not shown) inside the respective cylinders 39 to raise and lower upper platen 42 relative to lower platen 19. Transverse hangers 43 extend between the sides of each respective fore and aft pairs of clevises 41 and are connected thereto by a pin 44 extending through each clevis and registering hole in the transverse hangers 43. The transverse hangers 43 in turn support a depending pair of longitudinally extending hanger beams 45 to which a plurality of transverse spaced upper bars 46 are affixed. Surfaces 47, 48 and 49 on the respective bars 46 are in longitudinal registry, with the right angled surfaces 48 and 49 supporting the right angled platen 42 which may be made of plies in the manner of platen 19. Platen 42 is secured, as shown, to the bars 46. The outermost ply may be shaped and covered with a formed sheet 50 of metal like steel to act as an upper die, the configuration of which is in inverse correspondence to the configuration of the surface of base 24 presented toward die 50 to form a sheet 51 of formable resin or plastic material when such is placed therebetween to be shaped and bonded to base 24 as a cover therefor. The forward ends of the upper bars 46 are provided with guide slides 52 to engage surfaces 32 respectively and with an upper guide block slide 53 to engage tapered surface 35 when the new machine 10 is closed in the course of a forming operation.

Even descent of platen 42 and upper die 50 is provided for in the illustrated embodiment through hanging racks 54 pivotally connected to angles 55 secured to beams 15 adjacent the vertical corners of machine 10. The forward pair of racks 54 extend through vertical openings 59a in bearing members 56 secured to the forward beam 45, the back of the openings through the bearing members 56 serving as a back-up member for the back of such racks 54. The face of those forward racks 54 is in engagement with rack pinion 57 journaled in the bearing members 56. The rear pair of racks 54 are backed up by rollers 58 and side guide plates 59 are provided to each side of the rear racks 54. The rack teeth along the forward face of the rear racks 54 engage with the rear rack pinions 60 journaled in the bearings 61 attached to the rear beam 45. Each pair of rack pinions 57 and 60 adjacent the respective four corners of machine 10 are on common shafts 62 and 63, respectively. Those shafts 62 and 63 are provided at the outer ends thereof with sprockets 64 and the spacing between the ends of the shafts 62 and 63 at each end of the machines is safeguarded against deflection by a strut rod 65 outwardly of the respective sprockets 64. Each pair of sprockets 64 at each end of machine 10 is linked by a sprocket chain 66. Hence, the rise and fall of platen 42 and upper die 50 through the action of the piston rods 40 in cylinders 39 insure the uniform parallel descent of die 50 relative to its counterpart lower die comprising the upwardly presented surface of base 24 on lower platen 19. Additional guiding means may be provided in the form of plates 67 connecting the respective ends of beams 45, the plates 67 being generally guided by the adjacent corner posts 11 if desired.

The platen 42 and upper die 50 are pierced for the passage therethrough of spaced hold-down plungers 68 in the course of a forming operation. The hold-down plungers 68 may have a friction tip 69 on each thereof which may be made of rubber. Above the hole through platen 42 and die 50 there is a centering guide 70 affixed to the upper side of platen 42 between the appropriate bars 46, whereby as platen 42 and die 50 are retracted, that is, are raised, the conical opening centering guides 70 will center tip 69 so that further elevation of platen 42 and die 50 will move the parts into the respective initial positions as shown, for example, in Figure 2. Holddown cylinders 71 may be mounted by attachment to angles 72 extending between and secured to certain of the channels 36, as shown.

A plate 73 may also be secured across the top of the beams 45 to support a transformer 74 connected by upwardly extending flexible cables (not shown) to a suitable power source. Transformer 74 may have depending terminals 75 which are respectively connected to ribbon conductors 76 extending to respective ends of the upper metal die 50, which may be made of stainless steel for electrical connection thereto to provide the desired temperature in upper die 50 for the setting of adhesive along the bonding surface between the contiguous face of base 24, which is the lower die face and the underside of sheet material 51 shaped as a cover therefor in our new machine 10.

A plurality of spaced stop bars 77 extend between platen 42 to the rear of die 50 and block 33 in a member such that in descent, the back of stop 77 may be guided by the forward face of the blocks 33, the lower ends of the stops 77 passing downwardly between bars 16. The front face of the stops 77 when the machine is open, as shown in Figure 2, will act as a stop for the rear edge of formable sheet material 51 which preferably is heated to suitable forming temperature before being inserted into the machine through the front thereof in the direction indicated by the arrow 79 after base 24 is in place. The tilt of platen 19 and thereby of base 24 is such that sheet 51 will stably rest as indicated by the straight chain line in Figure 2. The fore and aft position of unshaped sheet 51 may be gauged by pulling the front edge thereof, as shown in Figure 2, up against the aligned rear surface of the front gauges 78 which are secured in longitudinal registry to the front of platen 19. The longitudinal or end-to-end position of sheet 51 may be gauged in terms of registry with base 24 by means of the ends of base 24 as sheet 51 is inserted in the new machine.

In operation, base 24 may be preassembled, coated with an adhesive on its outwardly presented surfaces 25 to 28, inclusive, to be covered by a shaped resin or plastic cover of laminate sheet material like Formica, Micarta, or others. Thus, in mass production, a roller conveyor may be placed by the point of assembly of base 24 and the end of machine 10 adjacent end 22 so that such base 24 can be run longitudinally into machine 10 and fitted in position, for example, on pad 30 or other registry means used with platen 19. Thereupon, a sheet of formable material like sheet 51 may be inserted through the front of the machine in the direction of arrow 79 and gauged as described above, the tilt of platen 19 and upper die 24 being such as to allow the sheet 51 to rest stably until upper platen 42 and upper die 50 is brought down upon sheet 51 to form it exactly to the shape of the adjoining surface of base 24. Before die 50 engages sheet 51, the holddown cylinders 71 are energized to extend the plungers 68 and press tips 69 against sheet 51, they remaining in engagement at suitable pressures until die 50 has engaged sheets 51 to a suitable extent so that unwanted shifting of sheet 51 cannot take place in the shaping thereof by the final closing of the respective platens and dies. As soon as no such shifting of sheet 51 can take place during such shaping operation, the plungers 68 are preferably retracted which will withdraw them from the openings through platen 42, die 50 and guide 70 as shown, for example, in Figure 3. Re-entry of the holddown plungers 68 takes place when platen 42 and die 50 are retracted to open position by the cylinder 39, as shown in Figure 2. As die 50 moves into shaping relation with lower die 24, final engagement takes place between the cooperating surfaces of slide 52 and surface 32, on the one hand, and the surfaces 53 and 35, on the other hand, to give the upper platen and die a slight thrust toward the front of the machine to insure tight coverage of base 24 by sheet 51 and effective bonding over the entire "glue" joint surface therebetween, the heat in upper die 50 serving to set the adhesive used for that joint, the platen 42 and die 50 remaining in final closed position for a sufficient length of time to make such bonding permanent between the shaped sheet material 51 and the particular base 24 that it covers. Whatever suitable adhesive is used may be applied either to the underside of sheet 51 or to the "upper die" surface of base 24 before they are inserted in machine 10. With the shaping and bonding operation complete, platen 42 and die 50 are retracted, the holddown plunger 68 having previously been retracted, and the newly covered counter top or the like may be removed from the other end of machine 10 as by a roller conveyor adjacent to end 23 whereupon the open machine 10 is ready for a new base 24 and a new sheet 51 of sheet material to be shaped and bonded to that new base 24.

Figure 4 illustrates a pneumatic circuit which may be utilized in the operation of our illustrated embodiment. Thus, a pipe 80 may comprise a source of compressed air which is constantly impressed through pipe 80a on valves 81 and 82. Those valves 81 and 82 have spring biased pilots 83 and 84, respectively, such that when the pilots are not subjected to the pressure of compressed air through pipe 85, the valves 81 and 82 are normally connected through pipes 86 and 87, respectively, to the rod end of the cylinders 39 holding the piston rods 40 in retracted position, with the head ends of those cylinders being connected through pipes 88 and 89, respectively, to the exhaust ports 90 and 91. Further, the supply of compressed air to pipe 85 is controlled through pipes 92 and 93, respectively. A three-way valve 94 having an "off" position shown in solid lines and an "on" position shown in dotted lines and an exhaust port 95 is connected to a control valve 96 mechanically linked to a second safety valve 97 having an exhaust port 98. Four hand pressure valves 99 are connected in series in pipe 93 leading to pipe 85 and parallel to pipe 100 connected to safety valve 97.

When it is desired to lower upper die 50 to engage in a shaping and bonding operation with our new machine, a workman turns valve 94 from its Off to its On position, thereby impressing air on valve 96 which, however, remains closed until mechanically opened by the attainment by platen 42 and upper die 50 of full descent position. That descent or lowering of platen 42 and die 50 by the extension of advancing of piston rods 40 is obtained by having the two workmen who normally attend the machine press in all four valves 99 at one and the same time, thereby insuring that those workmen will not get their hands caught in the machine as it is being closed. Should either workman take his hand off one of the valves 99, that valve will spring back to closed position and vent the air from pipe 85 through pipe 101, safety valve 97 and exhaust port 98 at any stage until full closure is obtained. If, however, the workmen have all four valves 99 pressed in, pipe 85 receives compressed air through open valves 99 which automatically shuts off exhaust port 98 and the pilots 83 and 84 press the valves 81 and 82 so that the air in line 80a passes to the head end of the cylinders 39 through pipes 88 and 89 while the rod end of the same cylinders is exhausted through the ports 90 and 91, respectively. When platen 42 reaches its final closure position, control valve 96 is thrown open and mechanically closes safety valve 97 whereupon the workmen can take their hands off the valves 99 since valve 96 will now pass air through pipe 102 to pipe 85 and keep the pilots 83 and 84 in advance position so that the cylinders 39 are maintained in extended piston or closed machine position for the length of time needed to perform the shaping and bonding operation undertaken. To retract, that is, to open machine 10, valve 94 is thrown to off position whereupon the pilots 83 and 84 begin to exhaust through valve 96 and exhaust port 95 which starts valves 81 and 82 over to their normal retract positions and as the platen 42 goes up control valve 96 is thrown closed thereby opening safety valve 97 putting the valves in a position for a new operation. During the retraction of platen 42, air from the head end of the cylinders 39 exhausts through the ports 90 and 91, respectively, until the platen is fully retracted where it remains because of the rod end of those cylinders 39 having compressed air from pipes 80 and 80a.

Compressed air in pipe 80 also passes through a pipe 103 to the valves 104 on the hold-down cylinders 71, which valves 104 are controlled by double-acting solenoids 105. Solenoids 105 in turn are connected to transformers 106, the primaries of which are across power lines 107. Each solenoid 105 may be actuated in one direction by closing a switch 108 and in the other direction by closing a switch 109. Hence, if it is desired to have the plungers 68 extended to engage in a hold-down operation, as described above, switch 108 is pressed and when released the valve 104 will maintain plungers 68 in the extended position reached by them. Then when it is desired to have the plungers 68 retracted, switch 109 is pressed until they reach the desired retracted position whereupon switch 109 is released and the plungers stay in such retraction position. It is evident that other circuit arrangements for operating controllable parts of our new embodiment may be provided by those skilled in the art to whom this invention is disclosed.

Although base 24 is a preassembled base which may be made of wood or other suitable material, for a counter top or the like, different kinds of bases may be used in our new machine 10 and in some cases may be substantially assembled in machine 10. For example, a counter top of a different kind such as shown in Figure 5 may comprise a bottom panel 110 of untempered hardboard to which a front edge rail 111 may be affixed in a preassembly. Similarly, a splash back member 112 with a cove piece 113, a top flat untempered hardboard top member 114 and a no-drip insert 114a may also be preassembled and secured together. A filler member may be used in the construction of the Figure 5 device in the form of a paper honeycomb member 115 which may be made of kraft paper, the upper and lower edges 116 and 117 of which may be precoated with a suitable thermally responsive adhesive. Thereby, if a platen similar to platen 19 is provided, without a pad 30 but with the exterior ply of metal, an assembly of the Figure 5 counter top may be made right in place on that metal sheet layer of platen 19 by first putting down the subassembly which includes bottom 110, then putting in the honeycomb filler member and thereafter placing the other subassembly including top member 114 in position thereon to provide a suitable base, comparable to base 24 for use as a lower die in our new machine for covering by a shaped and bonded resin or plastic sheet material member 51', a suitable adhesive being applied to places where the various members are to be joined in the course of such shaping and bonding. The metal layer covering the platen corresponding to platen 19 underneath bottom 110 in the modified embodiment being described may have its respective ends connected by conductors 76' shown in chain line in Figure 1 which in turn are connected to the terminals 75' of a transformer 74' whereby such lower metal layer may be heated to the desired temperature. In that modified embodiment, the closing of our new machine would not only enable the shaping of sheet 51' to be completely performed but the heating of both platens would enable the bonding to be made not only between the underside of sheet 51' and its base but also would enable the upper and lower edges 116 and 117 of honeycomb member 115 to be bonded respectively to the adjoining surfaces of top and bottom portions 114 and 110, respectively, thereby making a completely shaped in-place assembled and bonded counter top such as shown, for example, in Figure 5.

Various modifications may be made in aspects of our invention without departing from the spirit thereof or the scope of the appended claims.

We claim:

1. Apparatus for making surface shapes covered with formed sheet material, comprising, in combination, a structural frame of cubical outline, a plurality of spaced parallel lower bars mounted on said frame between the ends thereof, a tilted right-angled platen supported on said lower bars between the ends of said apparatus, a plurality of spaced fluid cylinders mounted on the upper part of said frame, said cylinders having piston rods projecting from the bottoms thereof toward said lower platen, a supporting beam member connected to said piston rods and depending therefrom, a plurality of spaced upper bars connected to the underside of said beam member, an invert upper right-angled platen supported on the underside of said bars in cooperative relation to said lower platen, an upper metal die covering the exterior of said upper platen for cooperative sheet forming relation with a lower die supported by said lower platen, means for positioning elements of a base for a surface shape in evenly supported relation to said lower platen to act as a lower die, means to heat at least one of said dies, means to generally guide movement of said upper platen and die relative to said lower platen and die, depending rack members adjacent the corners of said apparatus, rack pinions mounted on shafts on said beam member for engagement with said rack members, sprocket and chain members connected to said shafts to make all parts of said upper platen and die move uniformly relative to said lower platen and die, holddown fluid cylinders mounted on the upper part of said frame, holddown plungers projecting below said bottoms of said holddown cylinders, said upper platen and die having openings therethrough for the passage of said holddown plungers, means for positioning a sheet of formable material overlying a base placed in said lower platen, means for extending said holddown plungers to hold said material at least during commencement of engagement of said material by said upper die during a closure movement of said apparatus, means for retracting said holddown plungers, and menas for retracting said piston rods to raise said upper platen and die and open said apparatus when said material is shaped and bonded to said base.

2. Apparatus for making surface shapes covered with formed sheet material, comprising, in combination, a structural frame, a lower platen supported by the lower part of said frame, fluid cylinder means mounted on the upper part of said frame, said cylinder means having extensible means movable vertically toward and away from said lower part of said frame, an invert upper platen connected to and supported by said extensible means, a slightly tilted upper metal die which is substantially straight longitudinally with a longitudinal right angle bend therein adjacent one longitudinal edge of said upper die, said upper die being mounted on said upper platen in a downwardly facing position, a correspondingly tilted lower die mounted in evenly supported right-side-up relation on said lower platen and comprising a surface base having a corresponding longitudinal reverse right angle bend therein to nest with said bend in said upper die when said dies are closed, said closure movement being substantially vertical and at a relatively narrow angle to the upright side of said right angle in said lower die, said base being precoated with adhesive, means to heat at least said upper die, means for indexing a substantially flat sheet of formable material in predetermined position overlying said lower die, means to guide said upper platen and die into precise material shaping closure with said lower platen and die when said sheet material is between said dies, holddown members adapted to project below said upper platen and die in engagement with said sheet material during closure movement of said dies, said upper platen and die having openings therethrough for the passage of said holddown members, and means for retracting said extensible means to raise said upper platen and die and open said apparatus.

3. Apparatus for shaping flat resin-impregnated postformable laminated sheet material to form cabinet and counter tops or the like having adjoining surfaces in generally stepped right angle bend arrangement, comprising, in combination, a frame having upper and lower dies mounted therein, said dies being substantially straight in a longitudinal direction, means for vertically moving said upper die into closure with said lower die to bend shape said material between said dies in a single die-closing operation, said lower die having a longitudinal inside radius substantially right angle bend, said upper die having a longitudinal outside radius substantially right angle bend above said inside radius right angle bend to nest therewith upon closure of said dies, said dies being tilted so that a vertical plane through the vertex of said inside radius bend forms a narrow acute angle with the respective upright side of said last-mentioned bend, means for removably supporting a base member as a lower die to be bonded to the specific sheet of material shaped with the aid of said base member, and means to releasably holddown said material in advance of the closure of said dies to prevent shifting thereof during said closure.

4. Apparatus as set forth in claim 3, comprising, said upper die being made of metal, means for heating said upper die by electrical resistance heating, said base member being precoated with adhesive on the upper surface thereof, and means forming an upwardly converging angle with the upright sides of said bends to move said upper die laterally into firm nesting relation to said lower die with said shaped material therebetween upon closure of said dies.

5. Apparatus for shaping formable sheet material to be attached to a shaped base, comprising, in combination, upper and lower dies which are substantially straight from said to side and have a substantially right angle bend adjacent at least one longitudinal and corresponding edge on each die, the height of the upright side of said bend being minor relative to the distance of the bend itself to the other longitudinal edge of said dies, means for relatively moving said die into nesting closure spaced apart by the thickness of said sheet material to bend said sheet material in a single die-closing operation, the direction of said last-mentioned movement forming a narrow angle with said upright side of said bend, said lower die comprising a base member for sheet material formed thereby, means projecting between said dies to press against said sheet material in advance of closure of said dies to hold it against shifting, and means to move said upper die laterally through a small distance toward said upright side to press said sheet material and the bend therein tightly against said base upon said closure.

6. Apparatus for making surface shapes covered with postformed sheet material, comprising, in combination, a structural frame, a tilted right-angled lower platen supported by the lower part of frame, cylinder means mounted on the upper part of said frame, said cylinders having piston rods projecting downwardly, an invert upper right-angled platen supportably connected to said piston rods in cooperative relation to said lower platen, an upper metal die covering the exterior of said upper platen for cooperative sheet forming relation with a lower die supported by said lower platen, means for positioning elements of a base for a surface shape in evenly supported relation to said lower platen to act as a lower die, means to heat at least one of said dies, means to generally guide movement of said upper platen and die relative to said lower platen and die, means to make all parts of said upper platen and die move uniformly relative to said lower platen and die, holddown means mounted on the upper part of said frame having holddown members adapted to project below said upper platen and die, said upper platen and die having openings therethrough for the passage of said holddown members, means for positioning a sheet of postformable material overlying a lower die in the form of a base placed in said lower platen, means for extending said holddown members to hold said material at least during commencement of engagement of said material by said upper die during a closure movement of said apparatus, means for retracting said holddown members, and means for retracting said piston rods to raise said upper platen and die and open said apparatus when said material is shaped on said base.

References Cited in the file of this patent

UNITED STATES PATENTS

| 423,075 | Newell | Mar. 11, 1890 |
| 1,658,567 | MacDonald | Feb. 7, 1928 |
| 1,784,780 | Bronson | Dec. 9, 1930 |
| 1,908,681 | Bronson | May 16, 1933 |
| 1,916,361 | Curtiss | July 4, 1933 |
| 1,992,314 | Laussucq | Feb. 26, 1935 |
| 2,149,507 | Camfield | Mar. 7, 1939 |
| 2,446,038 | Amigo | July 27, 1948 |
| 2,508,301 | Stacy | May 16, 1950 |
| 2,651,061 | Polleys | Sept. 8, 1953 |
| 2,661,789 | Keller | Dec. 8, 1953 |
| 2,665,737 | Hasselquist | Jan. 12, 1954 |
| 2,712,846 | Del Savio et al. | July 12, 1955 |
| 2,746,514 | Warnken | May 22, 1956 |
| 2,778,765 | Dym | Jan. 22, 1957 |
| 2,781,844 | Pearson et al. | Feb. 19, 1957 |
| 2,841,823 | Van Hartesveldt | July 8, 1958 |

FOREIGN PATENTS

| 569,548 | Great Britain | May 29, 1945 |
| 495,452 | Belgium | May 15, 1950 |

UNITED STATES PATENT OFFICE
CERTIFICATE OF CORRECTION

Patent No. 2,973,025  February 28, 1961

Richard P. Baillie et al.

It is hereby certified that error appears in the above numbered patent requiring correction and that the said Letters Patent should read as corrected below.

Column 1, line 68, for "surfce" read -- surface --; column 5, line 3, for "extension of" read -- extension or --; line 4, for "workment" read -- workmen --; column 6, line 75, for "menas" read -- means --; column 7, line 71, for "said" read -- side --.

Signed and sealed this 12th day of September 1961.

(SEAL)
Attest:

ERNEST W. SWIDER
Attesting Officer

DAVID L. LADD
Commissioner of Patents
USCOMM-DC